(12) United States Patent
Huang

(10) Patent No.: US 10,901,469 B1
(45) Date of Patent: Jan. 26, 2021

(54) TOUCH MODULE

(71) Applicant: PRIMAX ELECTRONICS LTD., Taipei (TW)

(72) Inventor: Tai-Sou Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/693,817

(22) Filed: Nov. 25, 2019

(30) Foreign Application Priority Data

Sep. 12, 2019 (TW) .............................. 108133056 A

(51) Int. Cl.
*G06F 1/16* (2006.01)
*G06F 3/0354* (2013.01)
*G06F 3/02* (2006.01)

(52) U.S. Cl.
CPC ............ *G06F 1/169* (2013.01); *G06F 3/0202* (2013.01); *G06F 3/03547* (2013.01)

(58) Field of Classification Search
CPC ........ G06F 1/1643; G06F 3/033; G06F 1/169; G06F 3/0202; G06F 3/03547; G05G 9/047
See application file for complete search history.

(56) References Cited

U.S. PATENT DOCUMENTS

| 9,965,046 | B2 * | 5/2018 | Yang ..................... G06F 3/0202 |
| 2005/0052833 | A1 * | 3/2005 | Tanaka .................. G06F 1/1681 361/679.21 |
| 2006/0250377 | A1 * | 11/2006 | Zadesky ................. G06F 3/045 345/173 |
| 2007/0002030 | A1 * | 1/2007 | Hsu ..................... G06F 3/03547 345/173 |
| 2008/0264700 | A1 * | 10/2008 | Yoon ....................... G06F 3/041 178/18.03 |
| 2009/0073122 | A1 * | 3/2009 | Hou ....................... G06F 3/0312 345/163 |
| 2011/0254786 | A1 * | 10/2011 | Wen ...................... G06F 3/0338 345/173 |
| 2011/0254787 | A1 * | 10/2011 | Cheng ................. G06F 3/03547 345/173 |
| 2011/0254788 | A1 * | 10/2011 | Wang ................... H01H 25/002 345/173 |
| 2011/0255242 | A1 * | 10/2011 | Shao .................... G06F 3/03548 361/679.55 |

(Continued)

*Primary Examiner* — Amy Onyekaba
(74) *Attorney, Agent, or Firm* — WPAT, PC

(57) ABSTRACT

A touch module includes a casing, a touchpad, a supporting plate and a rotatable mechanism. The touchpad is installed in a first accommodation structure of the casing. The rotatable mechanism is pivotally coupled to a second accommodation structure of the casing. The supporting plate is movably installed on the casing, and combined with the touchpad. The second accommodation structure is extended from a specified side of the first accommodation structure. There is a horizontal gap between a lateral edge of the touchpad and an inner wall of the first accommodation structure corresponding to the specified side. While the touchpad is moved through the horizontal gap, a linking terminal of the rotatable mechanism is pushed by the touchpad or the touchpad is moved away from the linking terminal. Consequently, a stopping terminal of the rotatable mechanism is correspondingly inserted into or detached from the vertical gap.

15 Claims, 6 Drawing Sheets

(56) References Cited

U.S. PATENT DOCUMENTS

| | | | |
|---|---|---|---|
| 2012/0092257 A1* | 4/2012 | Chang | G06F 3/03544 |
| | | | 345/166 |
| 2013/0176671 A1* | 7/2013 | Saito | G06F 1/169 |
| | | | 361/679.09 |
| 2013/0194650 A1* | 8/2013 | Roth | B60R 1/02 |
| | | | 359/267 |
| 2014/0204507 A1* | 7/2014 | Su | G06F 3/03547 |
| | | | 361/679.01 |
| 2016/0147328 A1* | 5/2016 | Doi | G06F 3/0202 |
| | | | 345/157 |
| 2017/0017267 A1* | 1/2017 | Kitamura | G06F 3/03547 |
| 2017/0052611 A1* | 2/2017 | Komatsu | G06F 3/03547 |
| 2017/0255230 A1* | 9/2017 | Regimbal | G06F 1/1658 |
| 2018/0275775 A1* | 9/2018 | Zhang | G06F 3/03544 |
| 2019/0040906 A1* | 2/2019 | Buckingham | G06F 3/03547 |
| 2019/0163294 A1* | 5/2019 | Kanai | G06F 3/016 |
| 2019/0243475 A1* | 8/2019 | Huang | G06F 3/03547 |
| 2020/0349895 A1* | 11/2020 | Files | G06F 3/03547 |

* cited by examiner

TOUCH MODULE

FIELD OF THE INVENTION

The present invention relates to an input module, and more particularly to a touch module for an electronic device.

BACKGROUND OF THE INVENTION

A touchpad is an input module that allows the user's finger to press or slide on a smooth panel to control the operation of the electronic device. Since the touchpad is very thin, the touchpad is usually applied to a notebook computer, a smart phone, a personal digital assistant (PDA) or any other appropriate electronic device.

Generally, the operation of the touchpad can move a cursor and control windows through the touch function, and also achieve the functions of the left and right buttons of a mouse. With increasing development of science and technology, the touchpad can be operated in various function modes (e.g., a calculator mode or a hotkey control panel mode). However, the conventional technologies still have some drawbacks. For example, when the touchpad is operated in a function mode, the touchpad may be pressed by the user carelessly. If the touchpad is pressed by the user carelessly, the touchpad generates an erroneous pressing signal. Under this circumstance, the operation of the function mode is interrupted. In other words, the conventional touchpad is not user-friendly.

For overcoming the drawbacks of the conventional technologies, there is a need of providing a touch module that is capable of be quickly switched between a depressed mode and a non-depressed mode and avoiding the problem of generating an erroneous pressing signal.

SUMMARY OF THE INVENTION

The present invention provides a touch module capable of being quickly switched between a depressed mode and a non-depressed mode and avoiding the problem of generating an erroneous pressing signal.

In accordance with an aspect of the present invention, a touch module for an electronic device is provided. The touch module includes a casing, a touchpad, a supporting plate and a rotatable mechanism. The casing includes a first accommodation structure, an opening and a second accommodation structure. The first accommodation structure is formed in a bottom surface of the casing. The opening is formed in the first accommodation structure. The second accommodation structure is extended from a specified side of the first accommodation structure. The touchpad is installed in the first accommodation structure. A connection seat is disposed on a bottom surface of the touchpad. There is a horizontal gap between a lateral edge of the touchpad and an inner wall of the first accommodation structure corresponding to the specified side. The supporting plate is movably installed on the bottom surface of the casing, and combined with the connection seat. There is a vertical gap between the touchpad and the supporting plate through the connection seat. The rotatable mechanism is pivotally coupled to the second accommodation structure in a restorable manner, and includes a linking terminal and a stopping terminal. The linking terminal is disposed in the horizontal gap and aligned with the lateral edge of the touchpad. The stopping terminal is disposed in the horizontal gap and aligned with the vertical gap. While the touchpad is moved in a first direction or a second direction through the horizontal gap, the linking terminal is pushed by the lateral edge of the touchpad or the lateral edge of the touchpad is moved away from the linking terminal, so that the rotatable mechanism is rotated and the stopping terminal is correspondingly inserted into or detached from the vertical gap. The first direction and the second direction are opposite.

In an embodiment, the rotatable mechanism further includes a coupling part, and the linking terminal and the stopping terminal are connected with two opposite sides of the coupling part, respectively.

In an embodiment, the coupling part includes a pivotal hole and a groove. The groove is extended from the pivotal hole in a direction toward the stopping terminal.

In an embodiment, the rotatable mechanism further includes an elastic element, and the elastic element includes a main body and a torsional arm. The main body is disposed within the pivotal hole. The torsional arm is disposed within the groove. The torsional arm allows the stopping terminal to have a tendency to be away from the touchpad.

In an embodiment, a pivotal shaft is protruded from a bottom side of the second accommodation structure, and the pivotal shaft is penetrated through the pivotal hole and the main body of the elastic element sequentially.

In an embodiment, the pivotal shaft includes a pivotal segment and a fixing segment, and the pivotal segment and the fixing segment are connected with each other. The coupling part is sheathed around the pivotal segment through the pivotal hole, so that the coupling part is rotatable relative to the pivotal shaft. The main body of the elastic element is fixed on the fixing segment, so that the elastic element is fixed on the pivotal shaft.

In an embodiment, a first edge of the supporting plate includes two first elongated slots, and a second edge of the supporting plate includes two second elongated slots.

In an embodiment, the touch module further includes four position-limiting elements. After the four position-limiting elements are respectively penetrated through the corresponding first elongated slots and the corresponding second elongated slots and fixed on the bottom surface of the casing, the supporting plate is movable along length directions of the first elongated slots and the second elongated slots.

In an embodiment, a pressing switch is disposed on the bottom surface of the touchpad. The connection seat and the pressing switch are located at two opposite sides of the bottom surface of the touchpad, respectively.

Preferably, when the stopping terminal is detached from the vertical gap, the touchpad is permitted to be swung in the vertical gap by using the connection seat as a fulcrum. When the touchpad is swung and the pressing switch is contacted with the supporting plate, a corresponding pressing signal is generated.

In an embodiment, a stepped mechanism is formed on the inner wall of the first accommodation structure and at a lateral edge of the first accommodation structure that is in parallel with a moving direction of the touchpad.

In an embodiment, the connection seat includes an elastic arm corresponding to the stepped mechanism. The elastic arm is adjustably engaged with the stepped mechanism so as to position the touchpad.

In an embodiment, the elastic arm includes a locking block, and the stepped mechanism includes at least two locking notches corresponding to the locking block. While the touchpad is moved in the first direction or the second direction, the locking block is engaged with one of the at least two locking notches.

In an embodiment, a vertical thickness of the linking terminal is slighter larger than the vertical gap, and a vertical thickness of the stopping terminal is slightly equal to or smaller than the vertical gap.

In an embodiment, the electronic device is a notebook computer, a keyboard, a smart phone, a personal digital assistant, a writing tablet or a graphics tablet.

From the above descriptions, the touch module of the present invention is capable of being quickly switched between a depressed mode and a non-depressed mode through the linkage between the touchpad and the rotatable mechanism. When the touchpad is in the function mode corresponding to the calculator or the hotkey control panel, the pressing action on the touchpad will not erroneously generate the pressing signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
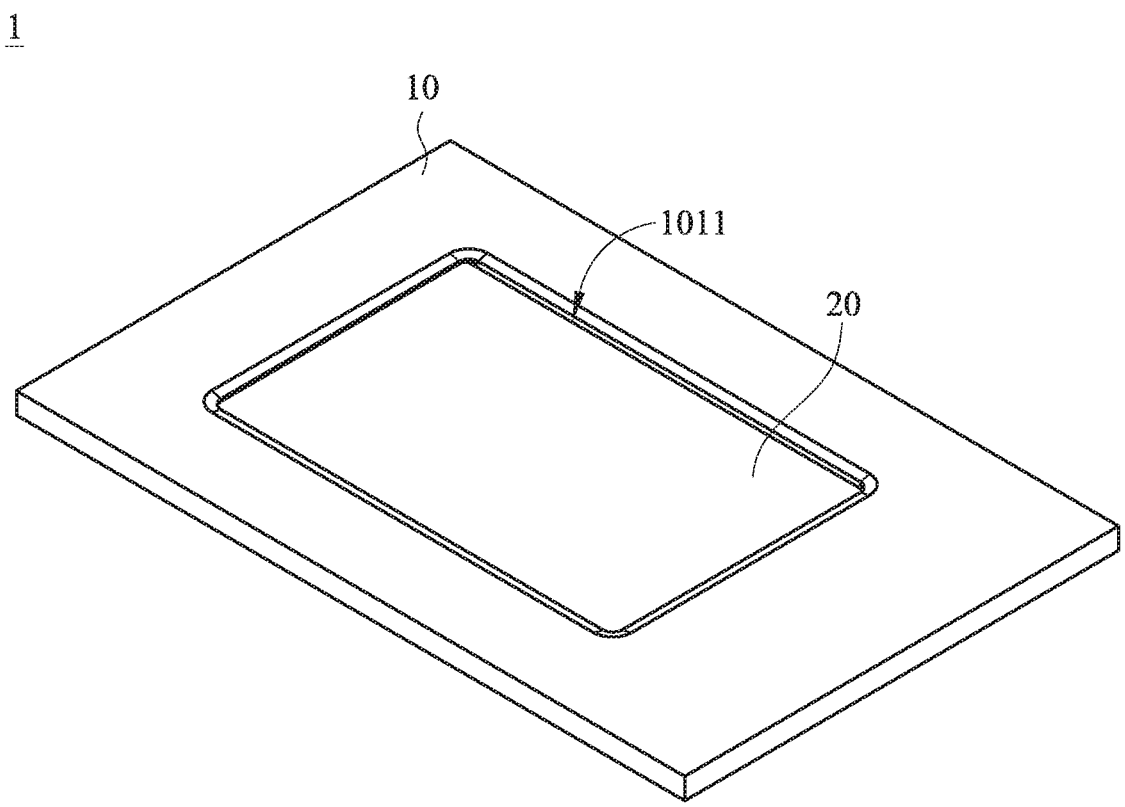
FIG. 1A is a schematic exploded view illustrating a touch module according to an embodiment of the present invention.
Figure 1B:
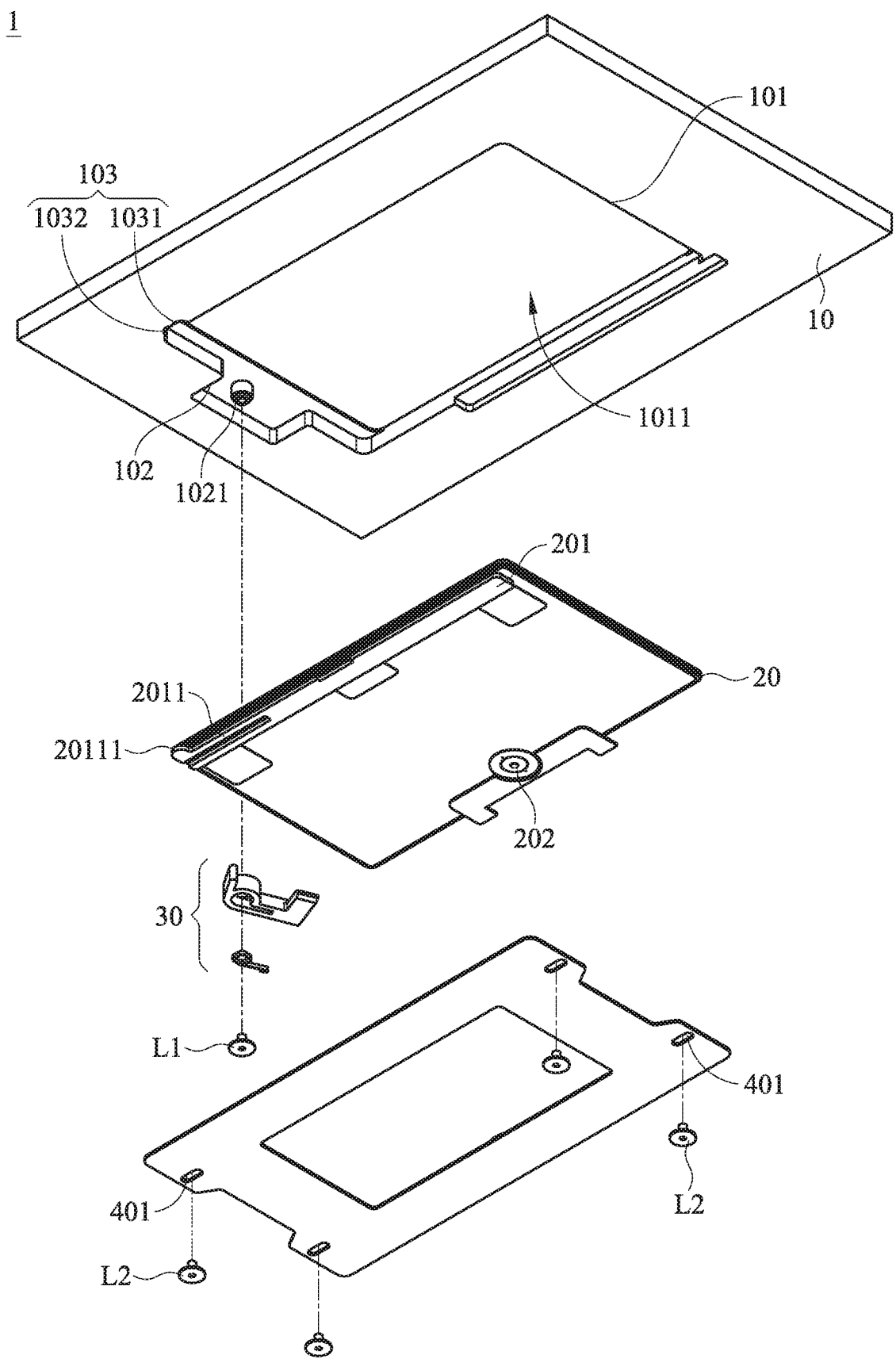
FIG. 1B is a schematic exploded view illustrating the touch module according to the embodiment of the present invention and taken along a viewpoint.

Please refer to FIGS. 1A and 1B. FIG. 1A is a schematic exploded view illustrating a touch module according to an embodiment of the present invention. FIG. 1B is a schematic exploded view illustrating the touch module according to the embodiment of the present invention and taken along a viewpoint. The touch module 1 is applied to an electronic device. An example of the electronic device includes but is not limited to a notebook computer, a keyboard, a smart phone, a personal digital assistant (PDA), a writing tablet or a graphics tablet. In an embodiment, the touch module 1 comprises a casing 10, a touchpad 20, a rotatable mechanism 30 and a supporting plate 40.

The casing 10 is a portion or the entire of a casing of the electronic device. A first accommodation structure 101 and a second accommodation structure 102 are formed in a bottom surface of the casing 10. The second accommodation structure 102 is extended from a specified side of the first accommodation structure 101. The first accommodation structure 101 comprises an opening 1011. The opening 1011 runs through the casing 10. Moreover, a pivotal shaft 1021 is protruded from a bottom side of the second accommodation structure 102.

The touchpad 20 is installed in the first accommodation structure 101. A portion of a top surface of the touchpad 20 is exposed to the opening 1011. Consequently, the touchpad 20 can be operated by the user. A connection seat 201 and a pressing switch 202 are installed on a bottom surface of the touchpad 20. Moreover, the connection seat 201 and the pressing switch 202 are located at two opposite sides of the bottom surface of the touchpad 20, respectively.

The orthographic projection area of the touchpad 20 is smaller than the orthographic projection area of the first accommodation structure 101. Consequently, there is a horizontal gap between a lateral edge of the touchpad 20 and an inner wall of the first accommodation structure 101 beside the second accommodation structure 102. Due to the horizontal gap, the touchpad 20 is movable within the first accommodation structure 101. That is, due to the horizontal gap, the touchpad 20 is movable in the direction toward the second accommodation structure 102 or in the direction away from the second accommodation structure 102. Moreover, a stepped mechanism 103 is formed on the inner wall of the first accommodation structure 101 and at a lateral edge of the first accommodation structure 101 that is in parallel with the moving direction of the touchpad 20. In this embodiment, the second accommodation structure 102 is extended from the specified side of the first accommodation structure 101, and the stepped mechanism 103 is located at the lateral edge of the first accommodation structure 101 and beside the specified side of the first accommodation structure 101. Moreover, the stepped mechanism 103 comprises a first locking notch 1031 and a second locking notch 1032, which are arranged beside each other.

Please refer to FIG. 1B. The connection seat 201 comprises an elastic arm 2011 corresponding to the stepped mechanism 103. The elastic arm 2011 is adjustably engaged with the stepped mechanism 103. The elastic arm 2011 comprises a locking block 20111 corresponding to the first locking notch 1031 and the second locking notch 1032. Consequently, while the touchpad 20 is moved within the first accommodation structure 101, the locking block 20111 is selectively engaged with the first locking notch 1031 or the second locking notch 1032. Consequently, the touchpad 20 is positioned.

The rotatable mechanism 30 is fixed on the pivotal shaft 1021 through a screw L1. Consequently, the rotatable mechanism 30 is pivotally coupled to the second accommodation structure 102 in a restorable manner.

The supporting plate 40 is movably disposed on the bottom surface of the casing 10. The supporting plate 40 is combined with the connection seat 201 of the touchpad 20 through an adhering means, a coupling means or a welding means. Consequently, the touchpad 20 is supported by the supporting plate 40, and the supporting plate 40 is moved with the touchpad 20.

Moreover, because of the thickness of the connection seat 201, a vertical gap is formed between the touchpad 20 and the supporting plate 40. The supporting plate 40 has a first edge and a second edge. Each of the first edge and the second edge of the supporting plate 40 comprises two elongated slots 401. After four position-limiting elements L2 are penetrated through the corresponding elongated slots 401, the first ends of the position-limiting elements L2 are fixed on the bottom surface of the casing 10. Consequently, the supporting plate 40 is movable along the length directions of the elongated slots 401. Similarly, the touchpad 20 that is moved with the supporting plate 40 is movable within the first accommodation structure 101 through the horizontal gap.

Figure 2A:
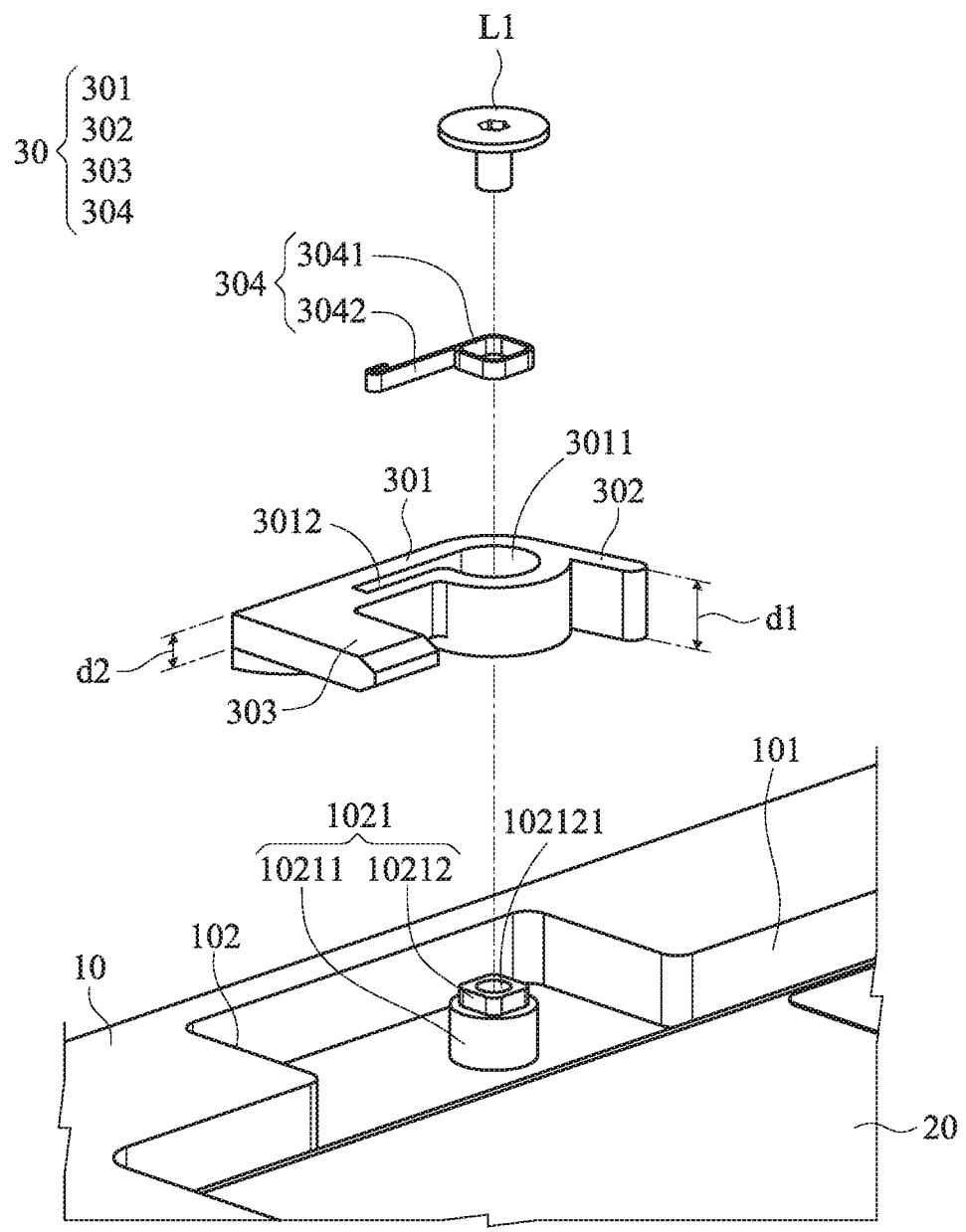
FIG. 2A is a schematic exploded view illustrating the rotatable mechanism and associated components of the touch module according to the embodiment of the present invention.
Figure 2B:
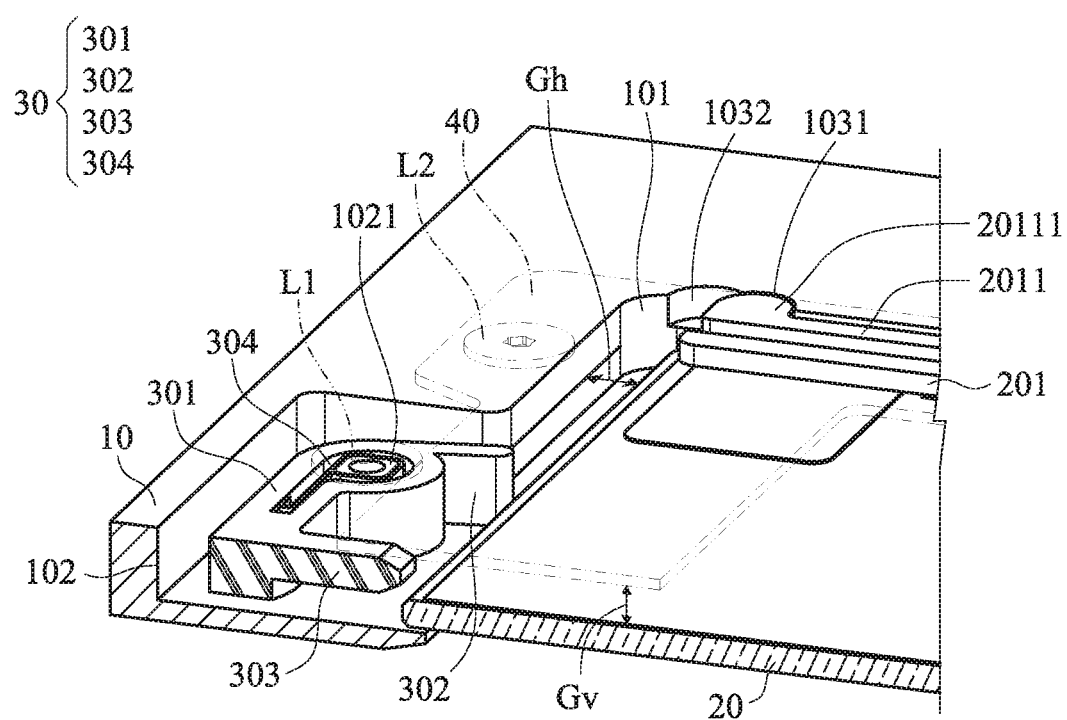
FIG. 2B is a schematic perspective view illustrating the assembled structure of the rotatable mechanism and associated components of the touch module according to the embodiment of the present invention.

Please refer to FIGS. 2A and 2B. FIG. 2A is a schematic exploded view illustrating the rotatable mechanism and associated components of the touch module according to the embodiment of the present invention. FIG. 2B is a schematic perspective view illustrating the assembled structure of the rotatable mechanism and associated components of the touch module according to the embodiment of the present invention.

As shown in FIG. 2A, the rotatable mechanism 30 comprises a coupling part 301, a linking terminal 302, a stopping terminal 303 and an elastic element 304. The linking terminal 302 and the stopping terminal 303 are connected with two opposite sides of the coupling part 301. The coupling part 301 comprises a pivotal hole 3011 and a groove 3012. The groove 3012 is extended from the pivotal hole 3011 in the direction toward the stopping terminal 303. In other words, the pivotal hole 3011 and the groove 301 are collaboratively formed as a P-shaped opening in the coupling part 301. The vertical thickness d1 of the linking terminal 302 is larger than the vertical thickness d2 of the stopping terminal 303. The elastic element 304 comprises a main body 3041 and a torsional arm 3042. The torsional arm 3042 is connected with the main body 3041. The main body 3041 is disposed within the pivotal hole 3011. The torsional arm 3042 is disposed within the groove 3012. In an embodiment, the elastic element 304 is a torsion spring.

The pivotal shaft 1021 comprises a pivotal segment 10211 and a fixing segment 10212. The pivotal segment 10211 and the fixing segment 10212 are arranged coaxially and connected with each other. The fixing segment 10212 comprises a bolt hole 102121. The bolt hole 102121 is arranged along the axial direction of the fixing segment 10212. The coupling part 301 is sheathed around the pivotal segment 10211 through the pivotal hole 3011, and thus the coupling part 301 is pivotally coupled to the pivotal shaft 1021. Consequently, the coupling part 301 is rotatable about the pivotal shaft 1021. The main body 3041 of the elastic element 304 is fixed on the fixing segment 10212, and thus the elastic element 304 is fixed on the pivotal shaft 1021. In other words, the elastic element 304 cannot be rotated with the coupling part 301. In this embodiment, the fixing segment 10212 of the pivotal shaft 1021 and the main body 3041 of the elastic element 304 have the corresponding polygonal shapes. Consequently, the main body 3041 of the elastic element 304 can be sheathed around the fixing segment 10212 of the pivotal shaft 1021, and the elastic element 304 can be fixed on the pivotal shaft 1021. In such way, the elastic element 304 cannot be rotated with the coupling part 301. Moreover, after a fastening element L1 is penetrated through the bolt hole 102121 and tightened into the bolt hole 102121, the rotatable mechanism 30 is installed on the pivotal shaft 1021.

Please refer to FIG. 2B. There is a horizontal gap Gh between the lateral edge of the touchpad 20 and the inner wall of the first accommodation structure 101 beside the second accommodation structure 102. Due to the thickness of the connection seat 201, a vertical gap Gv is formed between the touchpad 20 and the supporting plate 40. Moreover, a portion of the linking terminal 302 and a portion of the stopping terminal 303 are disposed in the horizontal gap Gh. The vertical thickness d1 of the linking terminal 302 is slightly larger than the vertical gap Gv. Moreover, the linking terminal 302 is aligned with the lateral edge of the touchpad 20. The vertical thickness d2 of the stopping terminal 303 is slightly equal to or smaller than the vertical gap Gv. Moreover, the stopping terminal 303 is aligned with the vertical gap Gv. As mentioned above, the torsional arm 3042 of the elastic element 304 is disposed within the groove 3012. Due to the torsional arm 3042, the stopping terminal 303 has the tendency away from the touchpad 20.

Figure 3:
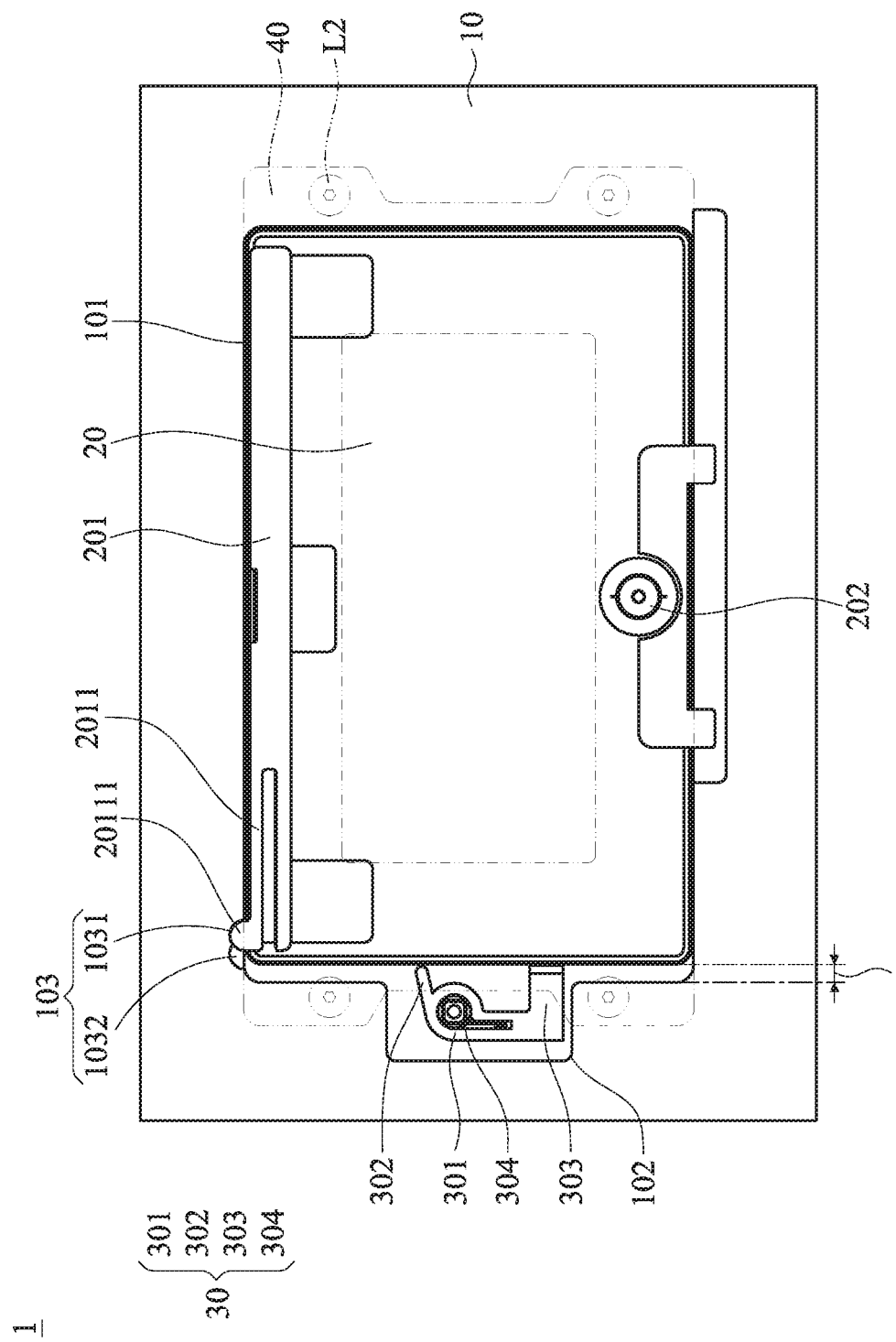
FIG. 3 is a schematic bottom view illustrating the touch module according to the embodiment of the present invention.

Please refer to FIG. 3. FIG. 3 is a schematic bottom view illustrating the touch module according to the embodiment of the present invention. As shown in FIG. 3, the locking block 20111 of the elastic arm 2011 is engaged with the first locking notch 1031. Consequently, the touchpad 20 is positioned. That is, the touchpad 20 is positioned at a location away from the second accommodation structure 102. Moreover, there is the horizontal gap Gh between the lateral edge of the touchpad 20 and the inner wall of the first accommodation structure 101. Under this circumstance, the portion of the linking terminal 302 and the portion of the stopping terminal 303 that are disposed in the horizontal gap Gh do not interfere with the touchpad 20.

In some embodiments, the first locking notch 1031 and the second locking notch 1032 have different depths. Consequently, while the touchpad 20 is moved, different tactile feels are generated. For example, the depth of the first locking notch 1031 is slightly smaller than the depth of the second locking notch 1032. While the touchpad 20 is moved by the user through the opening 1011 (see FIG. 1A) and the touchpad 20 is moved in the direction toward the second accommodation structure 102 through the horizontal gap Gh, the elastic arm 2011 is pushed by the inner wall of the first accommodation structure 101 and subjected to deformation. Consequently, the locking block 20111 of the elastic arm 2011 is gradually disengaged from the first locking notch 1031. Since the depth of the first locking notch 1031 is slightly smaller than the depth of the second locking notch 1032, the locking block 20111 can be easily detached from the first locking notch 1031 and moved to the second locking notch 1032. While the touchpad 20 is moved by the user through the opening 1011 and the touchpad 20 is moved in the direction away from the second accommodation structure 102 through the horizontal gap Gh, it is more difficult to detach the locking block 20111 from the second locking notch 1032 and move the locking block 20111 to the first locking notch 1031 because the depth of the second locking notch 1032 is larger. In such way, different tactile feels are generated while the touchpad 20 is moved by the user.

Figure 4:
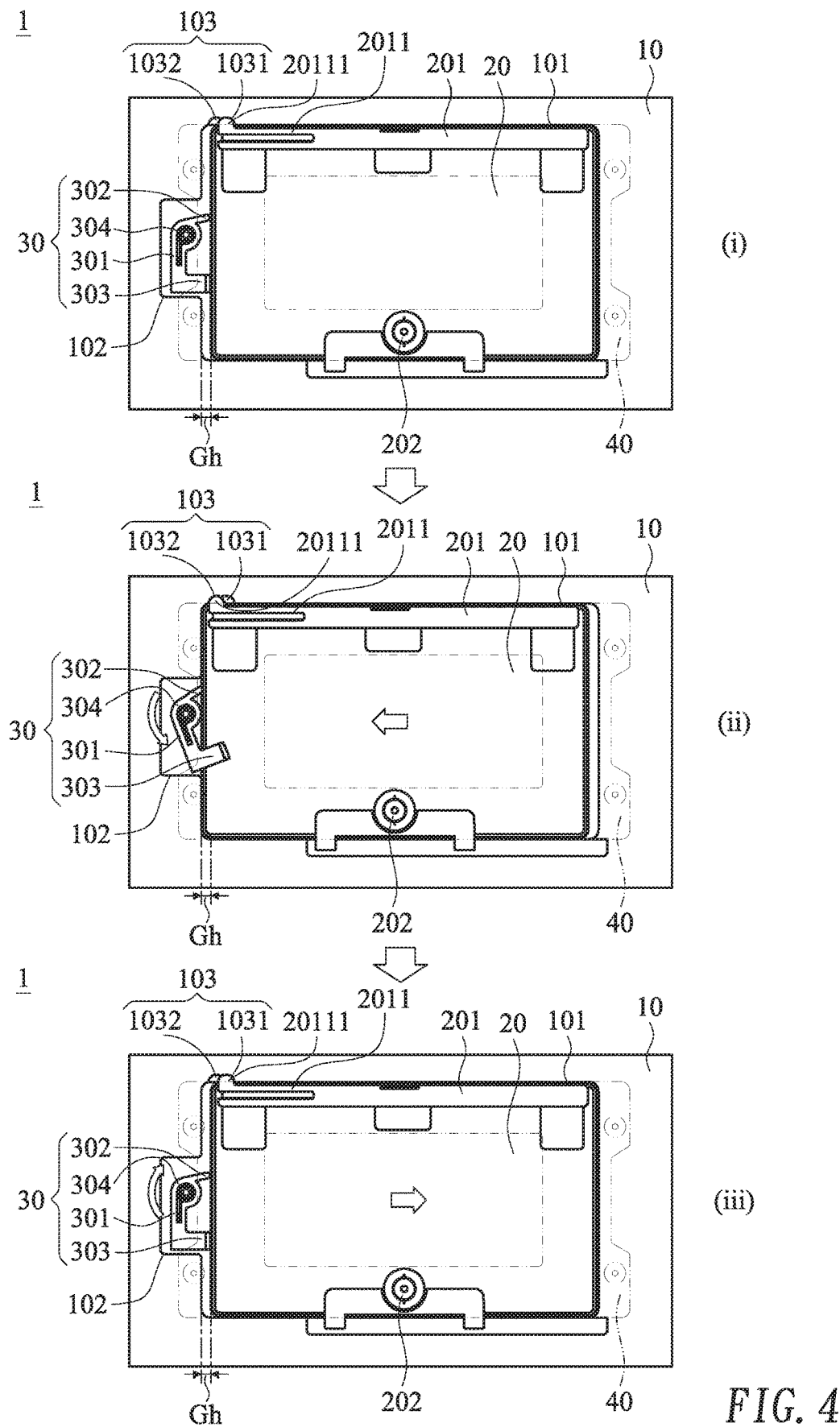
FIG. 4 schematically illustrates the operations of the touch module according to the embodiment of the present invention.

Please refer to FIG. 4. FIG. 4 schematically illustrates the operations of the touch module according to the embodiment of the present invention.

In the situation (i) of FIG. 4, the locking block 20111 of the touchpad 20 is engaged with the first locking notch 1031, and the touchpad 20 is positioned at the location away from the second accommodation structure 102. Under this circumstance, the linking terminal 302 and the stopping terminal 303 of the rotatable mechanism 30 do not interfere with the touchpad 20. While the touchpad 20 is pressed by the user through the opening 1011 (see FIG. 1A), the touchpad 20 is swung in the vertical gap Gv (see FIG. 2B) by using the connection seat 201 as a fulcrum. When the pressing switch 202 is contacted with the surface of the supporting plate 40, the touchpad 20 generates a corresponding pressing signal.

In the situation (ii) of FIG. 4, the touchpad 20 is moved by the user through the opening 1011, and the touchpad 20 is moved in the direction toward the second accommodation structure 102 through the horizontal gap Gh. Since the elastic arm 2011 is pushed by the inner wall of the first accommodation structure 101 and subjected to deformation, the locking block 20111 of the elastic arm 2011 is disengaged from the first locking notch 1031 and moved to the second locking notch 1032. When the locking block 20111 of the elastic arm 2011 is engaged with the second locking notch 1032, the touchpad 20 is positioned at a location near the second accommodation structure 102. While the touchpad 20 is moved in the direction toward the second accommodation structure 102, the linking terminal 302 is pushed by the lateral edge of the touchpad 20. Consequently, the rotatable mechanism 30 is rotated about the coupling part 301 in a counterclockwise direction, and the stopping terminal 303 is inserted into the vertical gap Gv between the touchpad 20 and the supporting plate 40 (see FIG. 2B). Under this circumstance, since the stopping terminal 303 and the touchpad 20 interfere with each other, the touchpad 20 cannot be swung in the vertical gap Gv. At the same time, the function mode of the touchpad 20 is switched. For example, the touchpad 20 can be used as a calculator or a hotkey control panel. Since the touchpad 20 is stopped by the stopping terminal 303, the touchpad 20 cannot be swung in the vertical direction. When the touchpad 20 is in the function mode corresponding to the calculator or the hotkey control panel, the pressing action on the touchpad 20 will not erroneously trigger the pressing switch 202 and the erroneous pressing signal will not be generated.

In the situation (iii) of FIG. 4, the touchpad 20 is moved by the user through the opening 1011, and the touchpad 20 is moved in the direction away from the second accommodation structure 102 through the horizontal gap Gh. Since the elastic arm 2011 is pushed by the inner wall of the first accommodation structure 101 and subjected to deformation, the locking block 20111 of the elastic arm 2011 is disengaged from the second locking notch 1032 and moved to the first locking notch 1031. When the locking block 20111 of the elastic arm 2011 is engaged with the first locking notch 1031, the touchpad 20 is positioned at the location away from the second accommodation structure 102. While the lateral edge of the touchpad 20 is moved away from the linking terminal 302, the torsional arm 3042 of the elastic element 304 (see FIG. 2A) is elastically restored. That is, as the rotatable mechanism 30 is rotated about the coupling part 301 in a clockwise direction, the rotatable mechanism 30 is returned to its original position and the stopping terminal 303 is away from the touchpad 20. Since the stopping terminal 303 is detached from the vertical gap Gv between the touchpad 20 and the supporting plate 40 (see FIG. 2B), the stopping terminal 303 of the rotatable mechanism 30 and the touchpad 20 do not interfere with each other. Under this circumstance, the touchpad 20 can be swung in the vertical gap Gv again.

In comparison with the conventional technologies, the touch module of the present invention is capable of being quickly switched between a depressed mode and a non-depressed mode through the linkage between the touchpad and the rotatable mechanism. When the touchpad is in the function mode corresponding to the calculator or the hotkey control panel, the pressing action on the touchpad will not erroneously generate the pressing signal. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module for an electronic device, the touch module comprising:
   a casing comprising a first accommodation structure, an opening and a second accommodation structure, wherein the first accommodation structure is formed in a bottom surface of the casing, the opening is formed in the first accommodation structure, and the second accommodation structure is extended from a specified side of the first accommodation structure;
   a touchpad installed in the first accommodation structure, wherein a connection seat is disposed on a bottom surface of the touchpad, and there is a horizontal gap between a lateral edge of the touchpad and an inner wall of the first accommodation structure corresponding to the specified side;
   a supporting plate movably installed on the bottom surface of the casing, and combined with the connection seat, wherein there is a vertical gap between the touchpad and the supporting plate through the connection seat; and
   a rotatable mechanism pivotally coupled to the second accommodation structure in a restorable manner, and comprising a linking terminal and a stopping terminal, wherein the linking terminal is disposed in the horizontal gap and aligned with the lateral edge of the touchpad, and the stopping terminal is disposed in the horizontal gap and aligned with the vertical gap,
   wherein while the touchpad is moved in a first direction or a second direction through the horizontal gap, the linking terminal is pushed by the lateral edge of the touchpad or the lateral edge of the touchpad is moved away from the linking terminal, so that the rotatable mechanism is rotated and the stopping terminal is correspondingly inserted into or detached from the vertical gap, wherein the first direction and the second direction are opposite.

2. The touch module according to claim 1, wherein the rotatable mechanism further comprises a coupling part, and the linking terminal and the stopping terminal are connected with two opposite sides of the coupling part, respectively.

3. The touch module according to claim 2, wherein the coupling part comprises a pivotal hole and a groove, wherein the groove is extended from the pivotal hole in a direction toward the stopping terminal.

4. The touch module according to claim 3, wherein the rotatable mechanism further comprises an elastic element, and the elastic element comprises a main body and a torsional arm, wherein the main body is disposed within the pivotal hole, the torsional arm is disposed within the groove, and the torsional arm allows the stopping terminal to have a tendency to be away from the touchpad.

5. The touch module according to claim 4, wherein a pivotal shaft is protruded from a bottom side of the second accommodation structure, and the pivotal shaft is penetrated through the pivotal hole and the main body of the elastic element sequentially.

6. The touch module according to claim 5, wherein the pivotal shaft comprises a pivotal segment and a fixing segment, and the pivotal segment and the fixing segment are connected with each other, wherein the coupling part is sheathed around the pivotal segment through the pivotal hole, so that the coupling part is rotatable relative to the pivotal shaft, wherein the main body of the elastic element is fixed on the fixing segment, so that the elastic element is fixed on the pivotal shaft.

7. The touch module according to claim 1, wherein a first edge of the supporting plate comprises two first elongated slots, and a second edge of the supporting plate comprises two second elongated slots.

8. The touch module according to claim 7, wherein the touch module further comprises four position-limiting elements, wherein after the four position-limiting elements are respectively penetrated through the corresponding first elongated slots and the corresponding second elongated slots and fixed on the bottom surface of the casing, the supporting plate is movable along length directions of the first elongated slots and the second elongated slots.

9. The touch module according to claim 1, wherein a pressing switch is disposed on the bottom surface of the touchpad, wherein the connection seat and the pressing switch are located at two opposite sides of the bottom surface of the touchpad, respectively.

10. The touch module according to claim 9, wherein when the stopping terminal is detached from the vertical gap, the touchpad is permitted to be swung in the vertical gap by using the connection seat as a fulcrum, wherein when the touchpad is swung and the pressing switch is contacted with the supporting plate, a corresponding pressing signal is generated.

11. The touch module according to claim 1, wherein a stepped mechanism is formed on the inner wall of the first accommodation structure and at a lateral edge of the first accommodation structure that is in parallel with a moving direction of the touchpad.

12. The touch module according to claim 11, wherein the connection seat comprises an elastic arm corresponding to the stepped mechanism, wherein the elastic arm is adjustably engaged with the stepped mechanism so as to position the touchpad.

13. The touch module according to claim 12, wherein the elastic arm comprises a locking block, and the stepped mechanism comprises at least two locking notches corresponding to the locking block, wherein while the touchpad is moved in the first direction or the second direction, the locking block is engaged with one of the at least two locking notches.

14. The touch module according to claim 1, wherein a vertical thickness of the linking terminal is slighter larger than the vertical gap, and a vertical thickness of the stopping terminal is slightly equal to or smaller than the vertical gap.

15. The touch module according to claim 1, wherein the electronic device is a notebook computer, a keyboard, a smart phone, a personal digital assistant, a writing tablet or a graphics tablet.

* * * * *